Aug. 30, 1932.  W. R. GRISWOLD  1,874,040

INTERNAL COMBUSTION ENGINE

Filed Oct. 26, 1928

Inventor

WALTER R. GRISWOLD

By Mellon Pickett

Attorney

Patented Aug. 30, 1932

1,874,040

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed October 26, 1928. Serial No. 315,343.

This invention relates to internal combustion engines and particularly to means for damping torsional vibration of the crank shafts and cam shafts of such engines.

One of the objects of the invention is to provide such damping means which occupies little room on the engine, but which provides a considerable damping action and which is capable of dissipating the energy of vibration in large engines of high power.

Another object of the invention is to provide means for damping torsional vibration in engine shafts in which the damping effect shall increase proportionally to increased engine speeds.

Another object of the invention is to provide a vibration damper for shafts in which the movable parts shall be automatically returned to their neutral position after displacement therefrom, by a force moment derived from the closed system of forces acting on the parts.

Another object of the invention is to provide a vibration damper for shafts in which springs or other position restoring elements shall be eliminated, and in which the motion of the parts shall be controlled entirely by the system of forces acting thereon in response to rotation of the shaft.

Other objects of the invention will appear from the following description taken in connection with the drawing, which forms a part of this specification, and in which.

Figure 1:
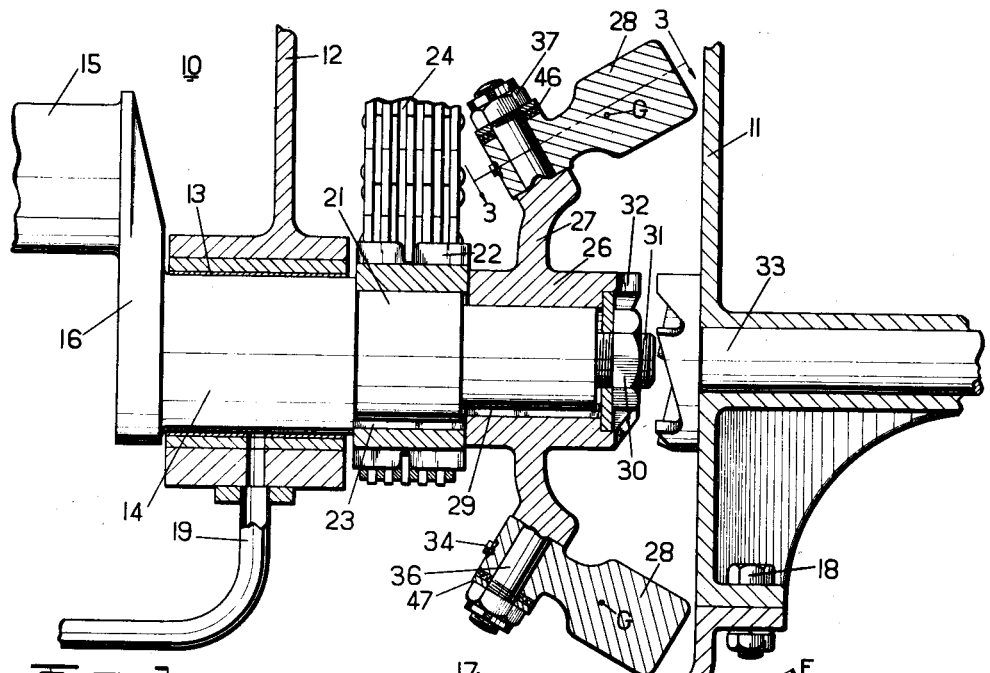
Fig. 1 is a vertical longitudinal section through a portion of an internal combustion engine embodying the invention.

Referring to the drawing, at 10 is shown a portion of an internal combustion engine having a crank case 11 provided with transverse webs 12 in which suitable alined bearings 13 are supported. In these bearings is journaled a crank shaft 14, having crank pins 15 and crank cheeks 16, which crank shaft is adapted to be driven by the usual connecting rods from pistons located in the engine cylinders (not shown). The lower part of the crank case is closed by an oil pan 17, removably secured thereto as by means of bolts 18, thus providing a sump for the lubricating oil of the engine. This oil is circulated to the various engine bearings in any convenient way, as by means of pipes 19, the overflow returning to the sump.

At the forward end of the engine, in front of the first bearing 13, the crank shaft is reduced in diameter as at 21, and a sprocket gear 22 is mounted thereon and connected by means of a key 23 to rotate with the shaft. This sprocket is adapted to drive a flexible chain 24 by means of which the cam shaft, the generator shaft, and other auxiliaries to the engine proper (not shown) may be driven.

The damping means of this invention is illustrated as mounted at the end of the crank shaft 14 adjacent the sprocket 22, and it consists of a hub or spider 26 having radially disposed arms 27 on which the weight or inertia members 28 are mounted. The hub is formed separately from the crank shaft but is supported on and keyed to the reduced end thereof as by a key 29 so that these parts rotate together. It is retained in its axial position on the shaft by a nut 30 on the threaded end 31 of the shaft, which nut may clamp the damper hub against the sprocket 22, or against a shoulder formed on the shaft. The end of the hub 26 is preferably formed with clutch teeth 32 which may be engaged with similar teeth on an endwise movable starter shaft 33. This is the usual hand starter crank for manually rotating the crank shaft for starting.

There may be any desired number of the arms 27, which are equally spaced about the crank shaft axis to maintain the balance of the device. In the embodiment of the invention illustrated, there are two of the arms 27 which are oppositely disposed. These are provided at their ends with bearing members or pivot pins 36 on which the inertia members 28 are journaled for oscillatory movement, which may be limited in any convenient way as by a stop pin 34, threaded in the member 28 and engaging in an arcuate slot 35 in the pin 36. These pins 36 are preferably integral with their respective arms, and are disposed in a plane through the crank shaft axis, but are inclined to that axis as clearly shown in Fig. 1, each of the pins having the same inclination. Each of the inertia members 28 has its bearing portion cooperating with the pin 36 in such a position that the center of gravity G of the inertia member is removed from the axis of oscillation.

Each inertia member 28 is positioned axially of its bearing pin between a shoulder formed on the arm 27 at its juncture with the pin, and a nut 37 threaded to the end of the pin. The outer face of the member 28 is adapted to cooperate with a friction member or disk 46 of any suitable material, which is retained on the pin by a washer 47, and this is in turn secured by the nut 37. It will be seen, therefore, that outward sliding motion of the inertia member on the pin is opposed by the nut 37 which retains all these parts in position. At the same time it will be evident that rotary movement of the weight on the pin 36 is resisted by the friction set up between the disk 46 and the surface 44 of the weight, and that the amount of this friction is proportional to the centrifugal pressure exerted by the inertia memmer on the friction disk 46. This pressure is exerted through the tendency of the weight to slide outwardly on the pin under a component of the centrifugal force of rotation, and is therefore proportional to some function of the speed of the crank shaft.

Figure 3:
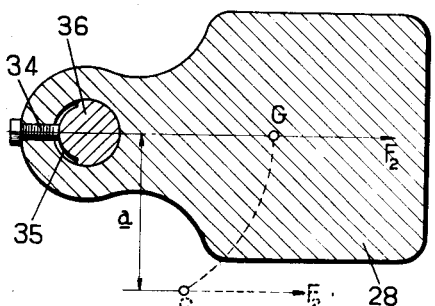
Fig. 3 is an enlarged section substantially on the line 3—3 of Fig. 1, showing in diagram the position restoring forces acting on the inertia member.
Figure 2:
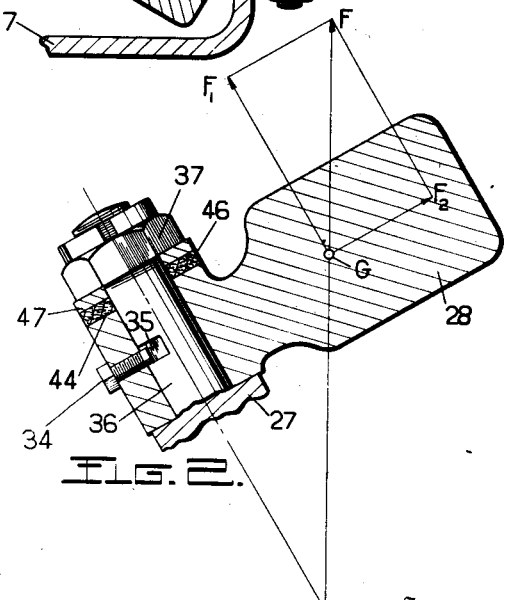
Fig. 2 is an enlarged detail section through one of the inertia members and its mounting, showing in diagram the system of centrifugal forces acting on said member.

In this invention the inertia members are urged toward a neutral position, in which position their centers of gravity G lie in the plane common to the axes of the pins 36 and the crank shaft axis. In this way the inertia members 28 are restored to their neutral position after oscillatory movement therefrom without the aid of separate position restoring means, such as springs, and this is accomplished by a field force from the system of centrifugal forces acting on the inertia member by reason of its rotation with the crank shaft 14. This system of centrifugal forces is represented by vectors in the diagram superposed on Fig. 2. The centrifugal force acting on the center of gravity of the inertia member 28 is represented by the vector F, radially disposed at right angles to the crank shaft axis. Because the pins are inclined to the shaft axis, this force F may be resolved into component forces $F_1$ and $F_2$, which are respectively parallel to and normal to the axis of the supporting pin 36, which is the axis of oscillation of the members 28. The component $F_1$ urges the inertia member 28 to move outwardly along its pin 36, and is the centrifugal component acting to increase the damping with increase of shaft speed. The force $F_2$ acts to pull the inertia member against the pin 36 when in neutral position. It is this force $F_2$ which is used in the present invention as a restoring force to urge the inertia member toward its neutral position and to restore the inertia member thereto after a deflection or movement on its pivotal axis. As clearly shown in Fig. 3, when the member 28 is in its neutral position, the force $F_2$ acts along the line joining the axis of oscillation with the center of gravity G, so that its only effect in this position is to slightly increase the pressure on the pin 36. Upon an oscillatory deflection of the inertia member 28, however, this force $F_2$ acts upon the member 28 through an arm $a$, the length of the arm $a$ depending upon the amount of deflection. There is thus exerted upon the inertia member a restoring moment $F_2 a$ tending to turn it about the axis of the pin 36 toward its neutral positon.

The operation of this device will be readily understood. When the shaft is rotating at a uniform velocity, the weight members 28 will be carried around with the shaft on their respective pins 36 substantially in their normal position, into which position they are continually urged by the force $F_2$. Upon the inception of a torsional vibration, however, an oscillatory movement of high frequency is superposed upon the uniform forward rotary movement of the shaft, which oscillations give to the shaft high accelerations which are alternately positive and negative. Because of their inertia, the weight members 37 cannot readily follow this oscillatory movement but tend to continue their unidirectional rotation about the shaft axis. Consequently an oscillatory movement of the weight members about the axes of the pins 36 occurs, which oscillation is opposed by the braking effect of the friction disks 46 on the members 28. Because of this friction, energy is dissipated from the system in the form of heat, thus preventing an increase of the total vibratory energy in the system, and damping the vibration in the well known manner.

It will furthermore be understood that since the radial pressure of the members 28 against the disks 46 is principally dependent upon the speed of rotation of the shaft, the braking effort will be greater at high engine speeds where the vibratory disturbances are more severe and greater damping effect is desired.

It will be understood that various forms of the invention other than those described above may be used without departing from the spirit or scope of the invention.

Having thus described the invention, what is claimed and desired to be secured by Letters Patent is:

1. A vibration damper comprising a shaft, oppositely disposed pins carried thereby in the plane thereof and inclined to the shaft axis, an oscillatory inertia member journaled on each of said pins, and friction means between each pin and its inertia member.

2. A vibration damper for a rotary shaft comprising an inertia member carried by the crank shaft for pivotal movement about an axis inclined to the shaft axis in response to the inertia forces of non-uniform rotation, said inertia member having its center of gravity off the pivotal axis whereby it is urged toward its neutral position by a moment including a component of the centrifugal force.

3. A vibration damper for a shaft comprising friction means carried by the shaft, inertia members supported for oscillation in frictional contact with said friction members on both sides of a neutral position in response to inertia forces, and means including mountings for said inertia members having axes inclined to the shaft axis whereby the inertia members are restored to their neutral position after oscillatory movement therefrom by a moment including centrifugal force.

4. A vibration damper for a shaft comprising an inertia member carried by the shaft and mounted to oscillate on an axis removed from its center of gravity in response to the inertia forces of shaft vibration, said axis being inclined to the shaft axis whereby said oscillatory movement is opposed by centrifugal force, and friction means to resist said oscillatory movement.

5. A vibration damper for a shaft comprising friction means carried by the shaft, inertia member supported for oscillation in frictional contact with said friction means in response to inertia forces and means including mountings for said inertia members and friction means having axes inclined to the shaft axis to exert upon the inertia members a restoring moment derived from the centrifugal force of rotation.

6. In a vibration damper for a shaft, the combination with oppositely disposed pivot pins secured to the shaft and inclined at equal angles to the shaft axis, of an inertia member rotatably and slidably mounted on each pin.

7. A vibration damper comprising a shaft, a plurality of pivot pins mounted thereon and spaced about the shaft axis, said pins being inclined at equal angles to said axis, inertia members mounted on the pins having centers of gravity offset from the pin axis, and friction members on the pins to resist all relative movement between said members and said pins.

In testimony whereof I affix my signature.

WALTER R. GRISWOLD.